(12) United States Patent
Sugiura et al.

(10) Patent No.: US 7,395,603 B2
(45) Date of Patent: Jul. 8, 2008

(54) RECIPROCATING SAW

(75) Inventors: Shin Sugiura, Anjo (JP); Kiyonobu Yoshikane, Anjo (JP)

(73) Assignee: Makita Corporation, Anjo-Shi (JP)

( * ) Notice: Subject to any disclaimer, the term of this patent is extended or adjusted under 35 U.S.C. 154(b) by 140 days.

(21) Appl. No.: 11/046,774

(22) Filed: Feb. 1, 2005

(65) Prior Publication Data
US 2005/0183271 A1    Aug. 25, 2005

(30) Foreign Application Priority Data
Feb. 25, 2004    (JP)   ............................ 2004-048981

(51) Int. Cl.
*B27B 11/02*    (2006.01)
(52) U.S. Cl. .............................. 30/377; 30/392; 30/374
(58) Field of Classification Search ........... 30/375–377, 30/371, 392, 393; 403/325
See application file for complete search history.

(56) References Cited

U.S. PATENT DOCUMENTS

| | | | |
|---|---|---|---|
| 4,335,768 A * | 6/1982 | Bachmann | .................... 30/475 |
| 5,007,172 A | 4/1991 | Palm | |
| 5,421,091 A | 6/1995 | Gerritsen, Jr. | |
| 5,988,928 A * | 11/1999 | Cheng | ........................ 403/102 |
| 6,317,988 B1 * | 11/2001 | Tachibana et al. | ............. 30/376 |
| 6,851,193 B2 * | 2/2005 | Bednar et al. | ................. 30/377 |
| 7,082,689 B2 * | 8/2006 | Beville et al. | ................. 30/377 |

\* cited by examiner

*Primary Examiner*—Boyer D. Ashley
*Assistant Examiner*—Omar Flores Sánchez
(74) *Attorney, Agent, or Firm*—Oliff & Berridge, PLC

(57) ABSTRACT

The reciprocating saw has a main body, a support member, a guide shoe, a locking member and an engaging member. The support member can be slid relative to the main body. The guide shoe is attached to an anterior end of the support member. The locking member can be switched between a state allowing the support member to be slid relative to the main body and a state not allowing the sliding. The engaging member is energized towards the support member. The engaging member and the support member engage or release their engagement, while the support member is being slid relative to the main body across a location allowing locking and a location not allowing locking.

10 Claims, 5 Drawing Sheets

RECIPROCATING SAW

CROSS-REFERENCE

This application claims priority to Japanese Patent Application No. 2004-48981, filed on Feb. 25, 2004, the entire contents of which are hereby incorporated by reference.

BACKGROUND OF THE INVENTION

1. Field of the Invention

The present invention relates to reciprocating saws. Specifically, it relates to reciprocating saws improved in an operation for adjusting location of a guide shoe.

2. Description of the Related Art

Reciprocating saws are one type of power tools. A reciprocating saw comprises a guide shoe attached to the reciprocating saw's main body (hereafter referred to simply as main body). When an operator utilizes a reciprocating saw for cutting a work, the operator keeps the guide shoe in contact with the work in order to stabilize the main body.

A reciprocating saw is constructed to be able to adjust the location of the guide shoe in a direction of reciprocating motion of a saw blade. By means of adjusting the location of the guide shoe, the length by which the saw blade protrudes from the guide shoe can be adjusted. Known techniques enabling adjustment of the guide shoe are, for example, the following.

A reciprocating saw disclosed in U.S. Pat. No. 5,421,091 has a support bar having a guide shoe attached thereto. The support bar can be slid, relative to a main body, in a direction of reciprocating motion of a saw blade. A plurality of location fixing grooves (termed 'cam faces' in that specification) is aligned in the support bar along its direction of sliding. The main body has a locking member (termed 'plunger' in that specification) capable of entering and exiting one of the location fixing grooves in the support bar. The locking member is energized in a direction for entering the location fixing grooves, and the locking member is provided with an operating button. This button is operated to resist the energizing force and press the locking member out of the location fixing groove. When an operator presses the operating button, the locking member is pressed out of the location fixing groove, and the support bar can be slid. When the operator removes his finger from the operating button, the locking member enters the location fixing groove, and the support bar cannot be slid.

When the location of the guide shoe is to be adjusted, the operator presses the operating button, slides the support bar until the guide shoe has been moved to a desired location, then releases his finger from the operating button. The operator must press the operating button continually throughout this series of operations.

A reciprocating saw disclosed in U.S. Pat. No. 5,007,172 has a support post that supports a guide shoe, and a plurality of location fixing grooves is formed in this support post. A locking member (termed 'pin' in that specification) that is D-shaped in cross-section is attached, in a manner allowing rotation, to a main body. An operating lever for rotating the locking member is also provided. When a cylindrical portion of the locking member is located at a location fixing groove side, the support post is locked to the main body and cannot be slid. When a flat part of the locking member is located at the location fixing groove side, the support post is unlocked and can be slid.

When the location of the guide shoe is to be adjusted, the operator operates the operating lever, causing the support post to be in an unlocked state. In this state, the support post is slid until the guide shoe has been moved to a desired location. The operating lever is then operated again to lock the support post.

In these reciprocating saws, the location of the guide shoe can be adjusted by choosing, as desired, any one of the plurality of location fixing grooves. Moreover, they have the advantage that the location fixing grooves fix the location of the guide shoe reliably.

SUMMARY OF THE INVENTION

In both the aforementioned reciprocating saws, the guide shoe cannot be locked if the locking member is located between the location fixing grooves. While altering the location of the guide shoe, the operator cannot recognize whether the guide shoe is in a location that allows locking. Only when attempting to lock the guide shoe after adjusting it to the desired location, the operator can discover that the guide shoe cannot be locked in this location. In this case, he must move the guide shoe again and find a location that does allow locking. Therefore, these reciprocating saws require that the operator carry out troublesome operations.

The present invention solves the aforementioned problem. It is thus one object of the present invention to provide techniques for enabling an operator to recognize whether the guide shoe is in a location that allows locking while adjusting the location of the guide shoe.

In one aspect of the reciprocating saw of the present teachings, the reciprocating saw comprises a support member, a locking member and an engaging member. The support member can be slid relative to a main body and has a guide shoe attached to its anterior end. The locking member can be switched between a state allowing the support member to be slid relative to the main body and a state not allowing this sliding. The engaging member is energized towards the support member. A portion of the engaging member is fixed to the main body.

The engaging member and the support member engage or release their engagement, while the support member is being slid relative to the main body. The support member is slid across locations which allow it to be locked by the locking member, and across locations which do not allow it to be locked. The engaging member and the support member engage or release their engagement, in conjunction with this sliding across the locations which allow locking and the locations which do not allow locking.

In this reciprocating saw, the operator slides the support member in order to adjust the location of the guide shoe. Thereupon, the engaging member and the support member engage, or release their engagement, as the support member passes across locations allowing locking or locations not allowing locking. The operator can recognize whether the support member is in a location allowing locking or in a location not allowing locking by means of minute oscillation, sound, or resistance occurring when the engaging member and the support member engage, or when their engagement is released. While the operator is adjusting the location of the guide shoe, the operator can recognize whether locking is possible or impossible in that location. It is no longer the case that the operator learns only after adjusting the guide shoe that the location chosen does not allow the guide shoe to be locked. Furthermore, the operator can lock the support member easily.

It is preferred that, after the engaging member and the support member have engaged, the engaging member prevents the release of their engagement by means of the weight of the support member. And it is preferred that release is performed in a simple manner by means of the operator exerting force to slide the support member. By adjusting the energizing force applied to the engaging member, a relationship can be realized in which the support member that is in the unlocked state is prevented from sliding freely due to its self-weight, while simultaneously it can be easily slid when the operator wishes to slide this support member.

In another aspect of the present teachings, the reciprocating saw also comprises a support member, a locking member and an engaging member.

A plurality of location fixing grooves are aligned in the support member along its direction of sliding. The locking member can be changed between a position in which it has entered the location fixing groove and a position in which it is away from the location fixing groove. When the support member is slid, it passes successively across locations in which the support member can be locked to the main body by means of the locking member, and locations in which the support member cannot be locked.

The engaging member is energized towards the support member. A portion of the engaging member is fixed to the main body. When the support member is not in a location allowing the locking member to lock the support member to the main body, the engaging member energizes the support member towards the location allowing locking. If the support member is in a location allowing the locking member to lock the support member to the main body, the engaging member exerts resistance force against relocation of the support member.

A spring, for example, may be used in the means for exerting energizing force on the support member. Alternatively, the engaging member itself may be formed of spring material.

The operator can lock the support member easily without incurring trouble in fixing the location of this support member.

According to the present teachings, it is possible to make it easier to fix the location of the support member that supports the guide shoe, and to perform the operation of locking the support member. The operator can adjust the location of the guide shoe simply and rapidly.

BRIEF DESCRIPTION OF THE DRAWINGS

FIG. 4(a) shows a locked state, and FIG. 4(b) shows an unlocked state.

DETAILED DESCRIPTION OF THE INVENTION

Preferred Features to Practice the Invention

Preferred features to practice the present invention are described below.

(FEATURE 1) The reciprocating saw comprises a support member in which a plurality of engaging holes aligned along its direction of sliding is formed, and an engaging member provided with an engaging convex part that engages with the engaging holes.

(FEATURE 2) The engaging holes in the support member are formed in locations such that the engaging convex part of the engaging member engages stably therein when the support member is in a location that allows locking.

(FEATURE 3) The engaging member of the reciprocating saw is formed of spring material, and the engaging convex part is energized in a direction for engaging the engaging convex part with the engaging hole.

(FEATURE 4) The engaging convex part of the engaging member has oblique faces that form a pair in the direction of sliding of the support member.

(FEATURE 5) Curved convex faces protruding towards the engaging member are formed between the engaging holes formed in the support member.

Preferred Embodiments to Practice the Invention

Figure 1:
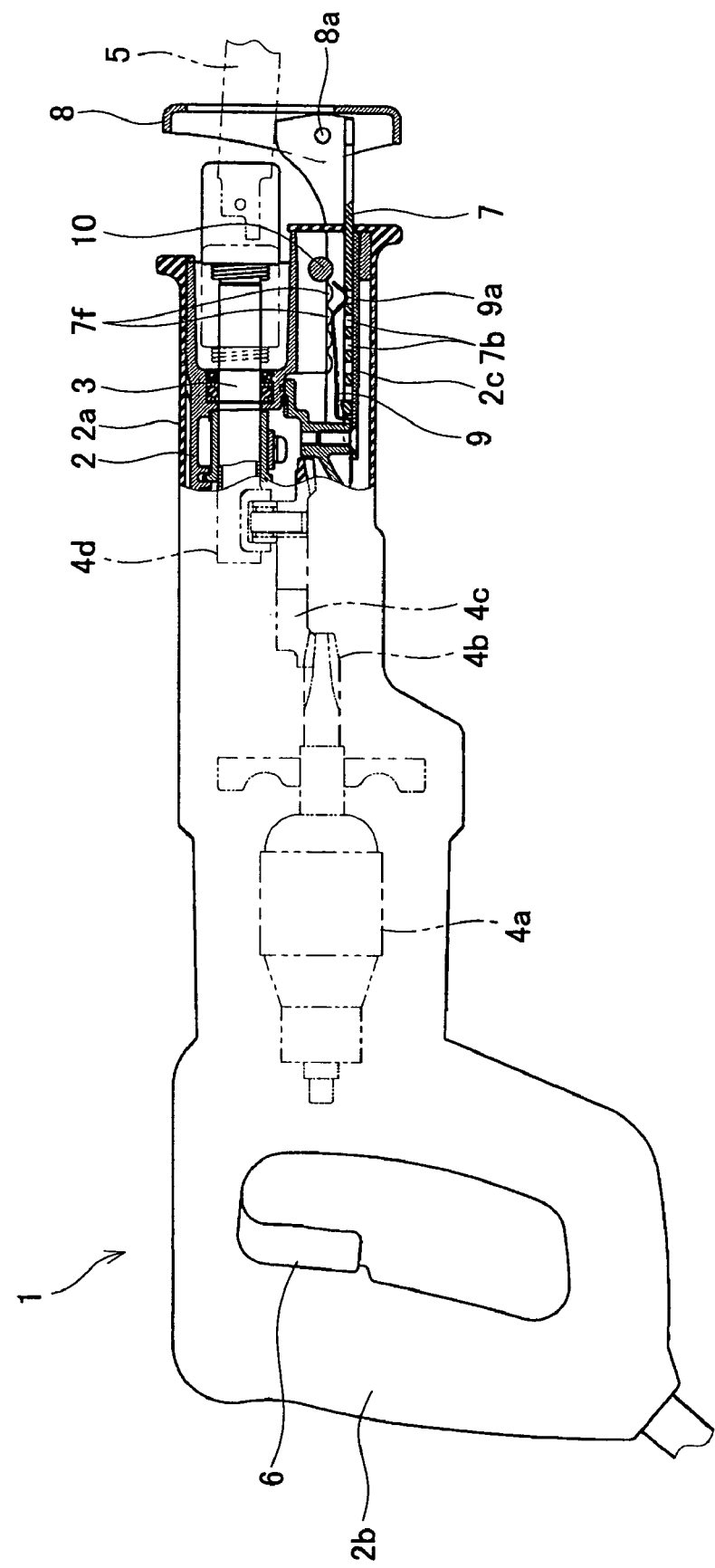
FIG. 1 shows a side face view of a reciprocating saw.

FIG. 1 shows a side face view showing the entirety of a reciprocating saw 1, this being one type of power tool. As shown in FIG. 1, a main body 2 of the reciprocating saw 1 is covered by a cover 2a. A grip 2b is provided at a posterior end of the main body 2. A driving mechanism that has a motor 4a is housed within the main body 2. Rotatory output of the motor 4a is converted into reciprocating motion via a pinion 4b, a gear 4c that engages with the pinion 4b, and a crank mechanism 4d engaging with the gear 4c. This reciprocating motion is transmitted to a slider 3. The slider 3 oscillates in the left-right direction of FIG. 1. One end of a saw blade 5 is attached to the slider 3. The driving mechanism drives the saw blade 5 to oscillate in the left-right direction of FIG. 1. A switch 6 shown in FIG. 1 is operated to turn the motor 4a on or off.

Figure 2:
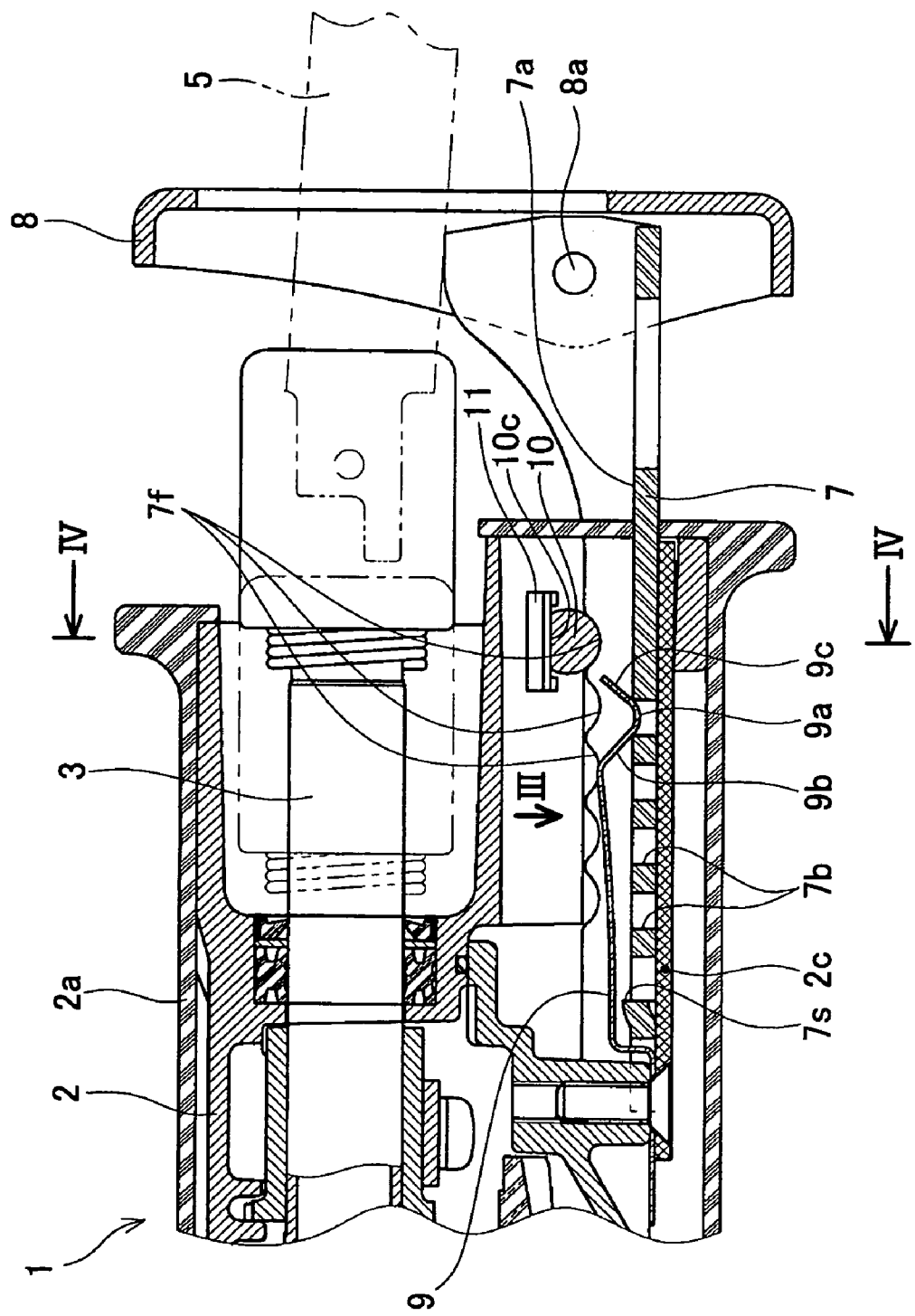
FIG. 2 is an expanded view showing a cross-section of essential parts of the reciprocating saw.

As is clear from FIG. 2, a guide rail 2c is fixed to an anterior end of the main body 2. The guide rail 2c extends in the left-right direction of FIG. 1 (a direction parallel to the direction of oscillation of the saw blade 5). The anterior end of the main body 2 comprises a support member 7 that can be slid along the guide rail 2c in the direction of oscillation of the saw blade 5. A guide shoe 8 is attached, in a manner allowing rotation, to a tip of the support member 7 by means of a pin 8a. A hole through which the saw blade 5 passes is formed in the guide shoe 8.

A location adjustment mechanism is provided in the anterior end of the main body 2. This location adjustment mechanism comprises a location fixing means for fixing the location of the support member 7 in the direction of its sliding, and a locking device for locking the support member 7 to the main body 2 such that sliding is not possible.

Figure 3:
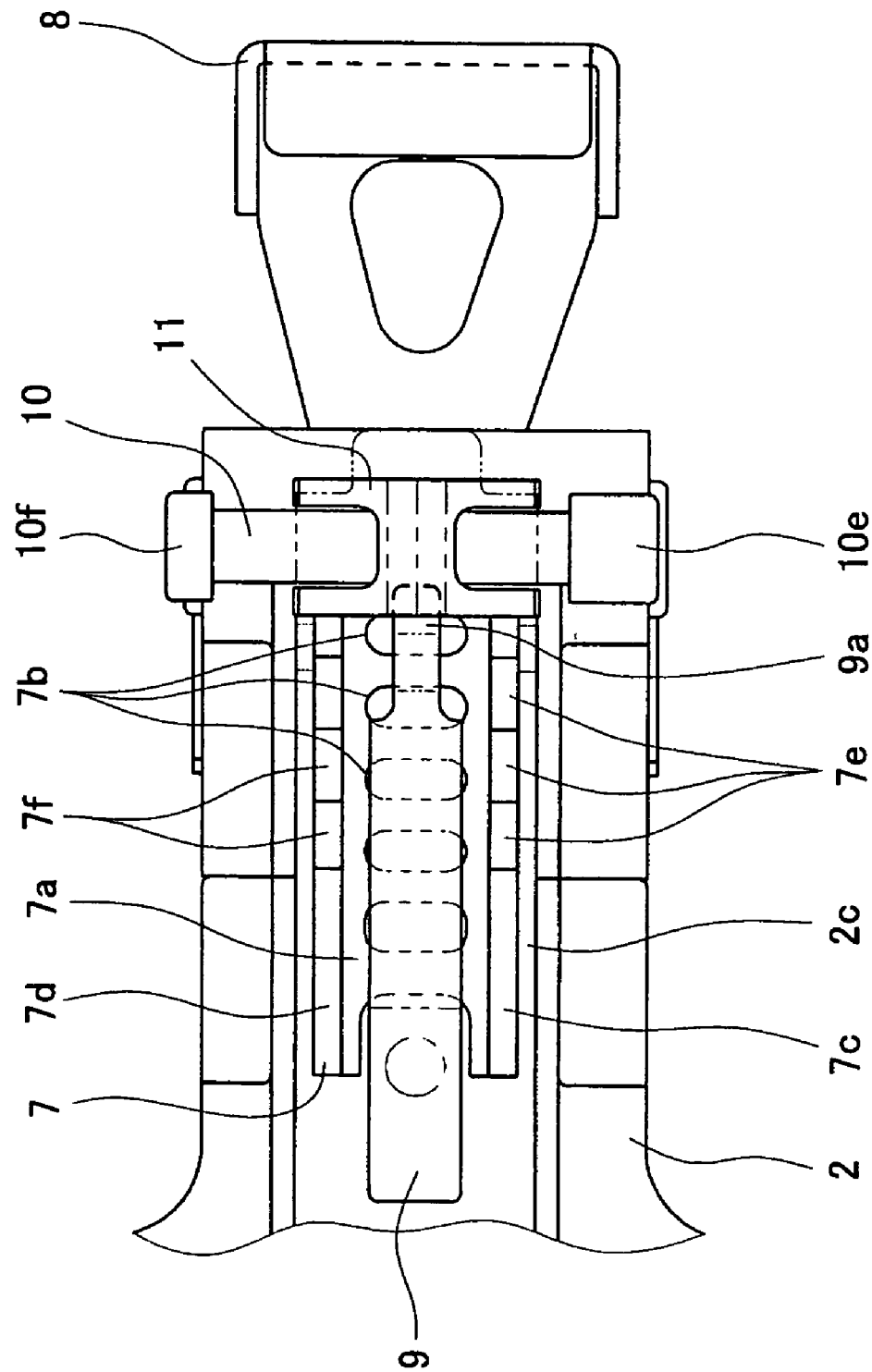
FIG. 3 shows a view along the arrow III of FIG. 2 in a state where a cover has been removed.
Figure 4:
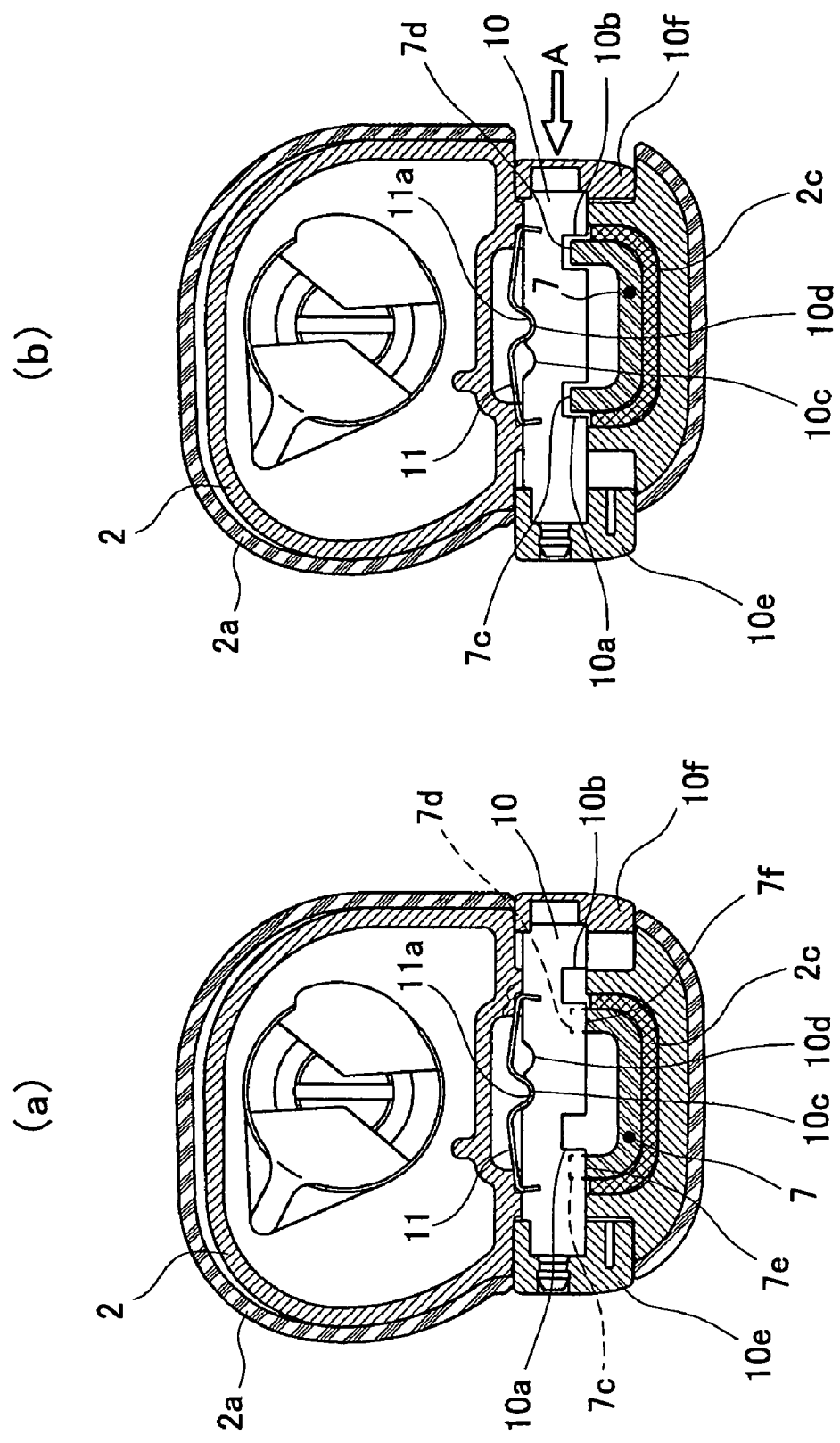
FIGS. 4(a) and 4(b) show a cross-sectional view along the line IV-IV of FIG. 2.

Next, the location fixing means will be described. As shown in FIG. 4, the guide rail 2c has a comparatively shallow U-shape in cross-section. Like the guide rail 2c, the support member 7 is formed in a cross-sectional U-shape. As shown in FIG. 3, an approximately flat base part 7a of the support member 7 has a plurality of slot-shaped engaging holes 7b. The engaging holes 7b are aligned in the direction in which the guide rail 2c extends, that is, in the direction in which the support member 7 slides. This is also shown in FIG. 2. An engaging member 9 extends in a cantilevered shape above the support member 7. The engaging member 9 is formed of spring material. A base end of the engaging member 9 is screwed to the main body 2, and a tip of the engaging member 9 is provided with an engaging protrusion 9a. The engaging protrusion 9a can engage with the engaging holes 7b. The spring force of the engaging member 9 press-fits the engaging protrusion 9a into the base part 7a of the support member 7. The engaging protrusion 9a has oblique faces 9b and 9c that form a pair in the direction of sliding. When either one of the oblique face 9b and 9c makes contact with a hole edge part of the engaging hole 7b, the spring force of the engaging member 9 moves the support member 7 towards a stable location in which both the oblique faces 9b and 9c make contact with the hole edge part. Moreover, the location of the support member 7 at which both the oblique faces 9b and 9c make contact with the engaging hole 7b is set to correspond to a location at which the support member 7 can be locked by a locking device (to be described). The engaging member 9 also functions as an energizing means. The engaging hole 7b and the engaging protrusion 9a could also be formed with other appropriately shape, such as concave and convex parts or the like. Furthermore, 7s in FIG. 2 is a stopper part formed in the support member 7 for preventing the removal thereof.

Next, the locking device will be described. As shown in FIG. 4, the support member 7 is provided with left and right side wall parts 7c and 7d. As shown in FIGS. 2 and 3, a plurality of concave locking parts 7e and 7f are formed in upper faces of the left and right side wall parts 7c and 7d of the support member 7. The concave locking parts 7e and 7f are formed at the same intervals as the engaging holes 7b.

A locking member 10 is provided at a location that intersects with the support member 7 at the anterior end of the main body 2. The locking member 10 can be switched between a position engaging with the concave locking parts 7e and 7f and a position releasing the engagement with the concave locking parts 7e and 7f. The locking member 10 can be moved in an up-down direction relative to FIG. 3, and in a left-right direction relative to FIG. 4.

The locking member 10 has an approximately circular bar shape. As is clear from FIG. 4, cut-away grooves 10a and 10b are formed therein for preventing the locking member 10 from engaging with the side wall parts 7c and 7d. Grooves 10c and 10d are formed in the approximately circular bar-shaped locking member 10. These grooves 10c and 10d engage with a protrusion 11a of a spring 11.

The movement of the spring 11 in the left-right direction relative to FIG. 3 is regulated by the locking member 10, and the movement of the spring 11 in the left-right direction relative to FIG. 4 is regulated by an inner wall of the main body 2. FIG. 4(a) shows a state in which the locking member 10 engages with the concave locking parts 7e and 7f, whereby the support member 7 is locked to the main body 2. The spring force of the spring 11 maintains the locking member 10 in a location in which the protrusion 11a engages with the groove 10c. When the operator pushes the locking member 10 against the spring force of the spring 11, in the direction of the arrow A, the locking member 10 assumes a state in which the support member 7 is unlocked. FIG. 4(b) shows a state in which the locking member 10 unlocks the support member 7. The cut-away grooves 10a and 10b and the side wall parts 7c and 7d reach the same location, thereby releasing the engagement between the locking member 10 and the concave locking parts 7e and 7f. The spring force of the spring 11 maintains the locking member 10 in a location in which the protrusion 11a engages with the groove 10d. 10e and 10f in FIGS. 3 and 4 are caps that cover ends of the locking member 10 and prevent the locking member 10 from rotating around an axis. When the operator pushes the cap 10e, the state shown in FIG. 4(a) is reverted to, and the locking member 10 assumes a state that locks the support member 7.

Next, the operation for adjusting the location of the guide shoe 8 of the reciprocating saw 1 will be described. First, the operator pushes the locking member 10 in the direction of the arrow A to the position shown in FIG. 4(b). The support member 7 is thereby unlocked. In this unlocked state, the support member 7 and the guide shoe 8 are slid, thus adjusting their location. When the support member 7 slides, the engaging protrusion 9a of the engaging member 9 is pressed so as to enter one of the engaging holes 7b. Resistance enables the operator to feel that this entry has occurred. When the operator reduces this pressing force, the spring force of the engaging member 9 causes the support member 7 to advance or retreat to a predetermined location, that is, to a location where locking is possible, and maintains the support member 7 in this location. At this juncture, the mutually corresponding concave locking parts 7e and 7f are located coaxially relative to the locking member 10, and the locking member 10 can be moved to the location shown in FIG. 4(a). When the operator pushes the cap 10e of the locking member 10, the concave locking parts 7e and 7f and the locking member 10 engage. The operator can thus lock the support member 7 easily.

Even if there is a considerable difference between the locations of the engaging protrusion 9a and the engaging hole 7b, either the oblique face 9b or 9c makes contact with a hole edge part of the engaging hole 7b. The spring force of the engaging member 9 moves the support member 7 to a stable location (a reliable location-fixing position) in which the engaging protrusion 9a engages firmly with the engaging hole 7b. Alternatively, the engaging member 9 energizes the support member 7 to that location. It is thus possible to prevent the support member 7 from being set in a location which does not allow locking.

Embodiment 2

Figure 5:
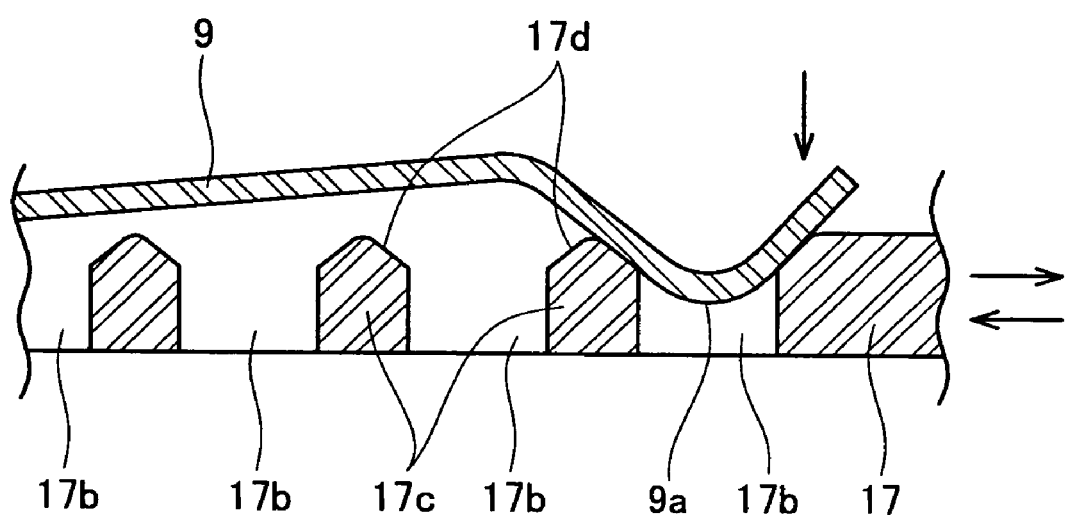
FIG. 5 shows a cross-section of essential parts of a reciprocating saw of a second embodiment.

A second embodiment of a reciprocating saw will be described. This presents a different configuration for an engaging part in the reciprocating saw 1 of Embodiment 1. As shown in FIG. 5, a plurality of engaging holes 17b are aligned in a support member 17. Upper end faces 17d of walls 17c between adjacent engaging holes 17b form upwardly-protruding curved convex faces. An engaging protrusion 9a of an engaging member 9 forms a downwardly-protruding curved convex face. As a result, when the engaging protrusion 9a makes contact with the upper end face 17d, engagement between the two is unstable irrespective of the location in which this contact occurs. Spring force of the engaging member 9 constantly energizes the support member 17 towards a stable location in which the engaging protrusion 9a enters the engaging hole 17b. By this means, the location of the support member 17 can be fixed more easily.

In the present embodiments, the engaging holes engaged with engaging member and concave locking parts engaged with locking member are formed separately in the support member. However, this is not necessary. A configuration is also possible wherein the engaging holes are not formed, and the engaging convex part of the engaging member engages with the concave locking part.

Specific examples of embodiments of the present invention are presented above, but these merely illustrate some possibilities of the invention and do not restrict the claims thereof. The art set forth in the claims includes transformations and modifications to the specific examples set forth above.

The technical elements disclosed in the present specification or figures may be utilized separately or in all types of conjunctions and are not limited to the conjunctions set forth in the claims at the time of submission of the application. Furthermore, the art disclosed in the present specification or figures may be utilized to simultaneously realize a plurality of aims or to realize one of these claims.

The invention claimed is:

1. A reciprocating saw comprising:
a main body;
a support member attached to the main body in a manner of allowing sliding relative to the main body; wherein a plurality of concave locking parts is formed in the support member along a sliding direction in which the support member slides;

a guide shoe attached to an anterior end of the support member;

a locking member being able to engage with any one of the concave locking parts of the support member and prevent the support member from sliding relative to the main body; and an engaging member, wherein the location of the engaging member is restricted by the main body, the engaging member is energized towards the support member, and while in direct contact with the support member the engaging member engages with and releases its engagement with the support member in conjunction with the sliding of the support member relative to the main body across a location allowing locking and a location not allowing locking.

2. A reciprocating saw as in claim 1, wherein the engaging member engages with the support member while the support member is in the location allowing locking, and the engaging member is released from its engagement with the support member while the support member is in the location not allowing locking.

3. A reciprocating saw as in claim 1, wherein the engaging member is formed of spring material.

4. A reciprocating as in claim 1, wherein the engaging member engages with the support member while the support member is in the location allowing locking, and the engaging member is released from its engagement with the support member while the support member is in the location not allowing locking, the engaging member is formed of spring material, and the spring force of the engaging member is set to be a force for preventing the release of the engaged state between the engaging member and the support member due to self-weight of the support member.

5. A reciprocating saw as in claim 1, wherein the support member is provided with a plurality of engaging holes arranged along the sliding direction, and the engaging member is provided with an engaging protrusion that engages with any one of the engaging holes.

6. A reciprocating saw as in claim 5, wherein a pair of oblique faces is formed in the engaging protrusion, both of the oblique faces contact with any one of the engaging holes while the support member is in the location allowing locking, and either one of the oblique faces contacts with any one of the engaging holes while the support member is in the location not allowing locking.

7. A reciprocating saw as in claim 6, wherein the engaging holes are formed at the same interval as the concave locking parts.

8. A reciprocating saw as in claim 7, wherein the support member is provided with a base wall part and a pair of side wall parts, the concave locking parts are formed in upper faces of the pair of side wall parts, and the engaging holes are formed in the base wall part.

9. A reciprocating saw as in claim 1, wherein the engaging member is provided with an engaging protrusion that engages with any one of the concave locking parts.

10. A reciprocating saw comprising:

a main body;

a support member attached to the main body in a manner of allowing sliding relative to the main body, wherein a plurality of concave locking parts is formed in the support member along a sliding direction in which the support member slides;

a guide shoe attached to an anterior end of the support member;

a locking member being able to engage with any one of the concave locking parts of the support member and prevent the support member from sliding relative to the main body; and an engaging and moving member, wherein the location of the engaging and moving member is restricted by the main body, the engaging and moving member is energized towards the support member, while in direct contact with the support member the engaging and moving member engages with and releases its engagement with the support member in conjunction with the sliding of the support member relative to the main body across a location allowing locking and a location not allowing locking, and the engaging and moving member moves the support member along the sliding direction to the location allowing locking when the support member is in the location not allowing locking.

\* \* \* \* \*